W. B. STURGIS.
CULTIVATOR.
No. 184,441. Patented Nov. 14, 1876.
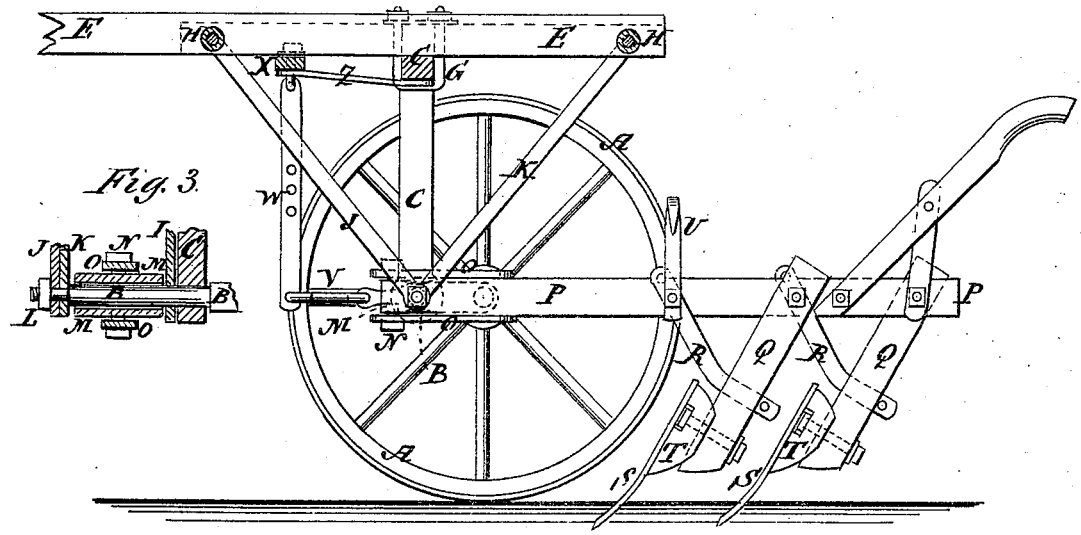
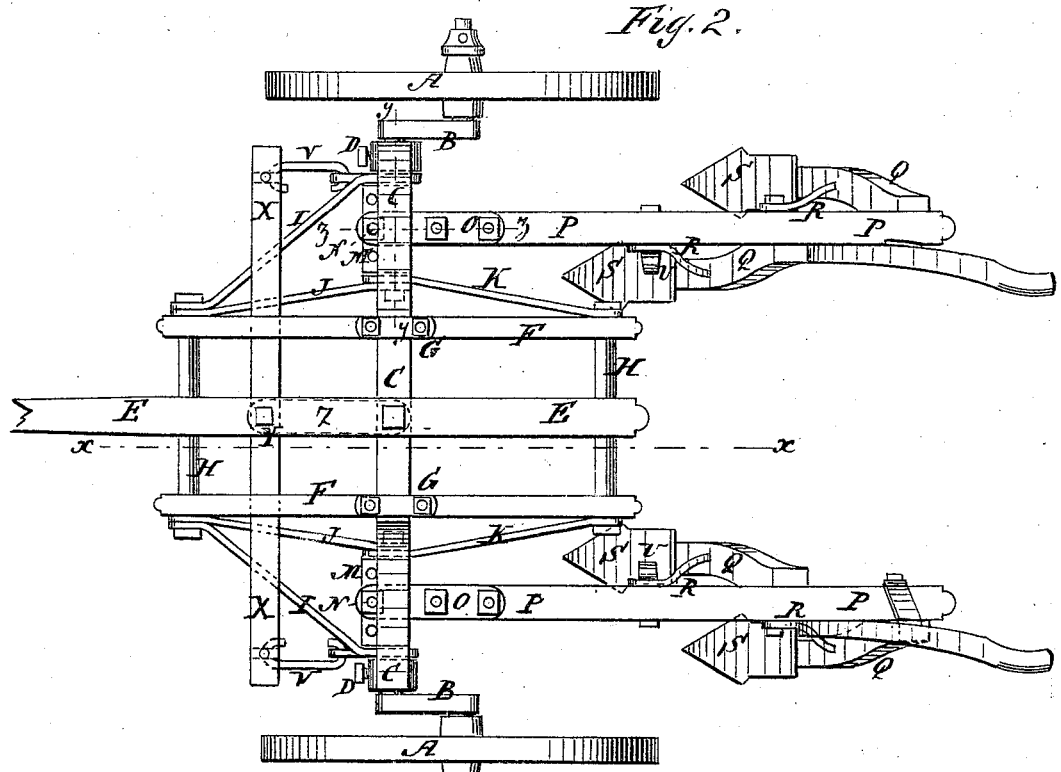
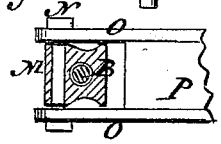
WITNESSES:
E. Wolff
John Goethals
INVENTOR:
W. B. Sturgis
BY Munn & Co
ATTORNEYS.

UNITED STATES PATENT OFFICE.

WILLIAM B. STURGIS, OF SHELBYVILLE, ILLINOIS.

IMPROVEMENT IN CULTIVATORS.

Specification forming part of Letters Patent No. 184,441, dated November 14, 1876; application filed August 21, 1876.

*To all whom it may concern:*

Be it known that I, WILLIAM B. STURGIS, of Shelbyville, in the county of Shelby and State of Illinois, have invented a new and useful Improvement in Cultivators, of which the following is a specification:

Figure 1 is a vertical longitudinal section of my improved cultivator, taken through the line $x\,x$, Fig. 2. Fig. 2 is a top view of the same. Fig. 3 is a detail section taken through the line $y\,y$, Fig. 2. Fig. 4 is a detail section, taken through the line $z\,z$, Fig. 2.

Similar letters of reference indicate corresponding parts.

The object of this invention is to furnish an improved cultivator which shall be simple in construction and effective in operation, being easily adjusted, guided, and controlled.

The invention relates to the construction and arrangement of parts—namely, the short axles, socket and set screws, front and rear braces, the curved bar, to which the frame of the machine is attached, and the jointed coupling of the cultivator-beams, all as hereinafter described and claimed.

A are the wheels, which revolve upon the outer arms of the crank-axles B. The inner arms of the crank-axles B pass through holes in the ends of the bar C, where they are secured in place adjustably by set-screws D. The bar C is arched or bent at an angle to raise its middle part, so that the machine may be drawn over tall plants without injuring them. To the center of the bar C is secured the tongue E, the rear end of which projects in the rear of the said bar. To the bar C, upon the opposite sides of and equally distant from the tongue E, are secured the two bars F by clips G. The forward and rear ends of the bars F are connected with each other and with the tongue E by rods or long bolts H. To each end of the forward rod or bolt H are secured the upper ends of two braces, I J. The lower end of the brace I is placed upon the outer part of the inner arm of the crank-axles B, close to the inner sides of the ends of the bar C. The lower ends of the braces J and of other braces, K, are placed upon the end of the said inner arms of the said axles, rest against shoulders formed upon said axles, and are secured in place by nuts L, screwed upon the ends of the axles, as shown in Figs. 1 and 3. The upper ends of the braces K are secured to the ends of the rear rod or bolt H. Upon the inner arms of the crank-axles B, between the ends of the braces J K and the ends of the brace I and bar C, are placed blocks M, the upper and lower sides of which are grooved, as shown in Fig. 4, and through its forward part are formed three (more or less) holes to receive the bolts N, which also pass through the ends of the straps O, placed above and below said blocks. The rear ends of the straps O are secured to the upper and lower sides of the forward ends of the plow-beams P, so that the rear ends of said plow-beams may have a free lateral and vertical movement, to enable the plows to be readily guided.

To the opposite sides of the rear parts of the plow-beams P are attached the upper ends of the standards Q, the draft-strain upon which is sustained by the braces R, the upper ends of which are bolted to the beams P, several holes being formed in the said ends to receive the said bolts, to enable the pitch of the plows to be adjusted as required. The rear ends of the braces R pass through holes in the standards Q, and have holes formed in them to receive wooden pins, which are made of such a size as to sustain the draft-strain, but which, should the plows strike an obstruction, will break, and allow the standard to swing back without being broken. S are the plow-plates, to the rear sides of which are bolted or riveted blocks T, the rear sides of which are grooved or concaved longitudinally, to fit upon the forward sides of the lower ends of the standards Q. The blocks T have holes formed through them to receive the bolts by which they are secured to the standards Q, and have notches formed in their forward sides to receive the heads of said bolts. The holes through the standards Q are made larger than the bolts that pass through them, so that the plows may be adjusted to throw the soil toward or from the plants, as may be desired. To the plow-beams P are attached upwardly-projecting hooks U, to hook upon the braces K, to support the plows away from the ground when turning around and passing from place to place.

To an eye formed upon the lower end of the brace K or bar C, or connected with the arm of the axle B, is pivoted a bar, hook, or link, V, to the other end of which is pivoted the lower end of the bar W. The upper end of the bar W is pivoted to the end of the doubletree X, which is pivoted at its center to the tongue E by a bolt, Y. The bolt Y is strengthened against the draft-strain by a strap, Z, secured to its end, and the rear end of which is secured by the bolt that secures the tongue E to the bar C. Several holes are formed in the bars W to receive the whiffletree-clevis, so that the point of draft attachment may be adjusted higher or lower, as may be desired.

Having thus described my invention, I claim as new and desire to secure by Letters Patent—

The tubular or bored coupling-blocks M, the short crank-axles B, the curved bar C, having perforated ends, the set-screws D, for securing the axles in any adjustment, the pair of front braces I J and the rear brace K, inclined as specified, and the frame F, all constructed and arranged as shown and described.

WILLIAM B. STURGIS.

Witnesses:
GEORGE C. MILLER,
EDWARD WERTENHOVER.